(12) United States Patent
Andarawis et al.

(10) Patent No.: US 8,310,120 B2
(45) Date of Patent: Nov. 13, 2012

(54) SYSTEM AND METHOD FOR MONITORING HEALTH OF ELECTRICAL MACHINES

(75) Inventors: Emad Andarawis Andarawis, Ballston Lake, NY (US); John Erik Hershey, Ballston Lake, NY (US); Ertugrul Berkcan, Clifton Park, NY (US); Brock Matthew Lape, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/870,865

(22) Filed: Aug. 30, 2010

(65) Prior Publication Data
US 2012/0049697 A1    Mar. 1, 2012

(51) Int. Cl.
*H02K 11/00*    (2006.01)
*H02K 23/66*    (2006.01)

(52) U.S. Cl. ................................. 310/68 B; 73/161
(58) Field of Classification Search ............. 310/68 B; 73/161
See application file for complete search history.

(56) References Cited

U.S. PATENT DOCUMENTS

| | | | | |
|---|---|---|---|---|
| 2,383,550 | A * | 8/1945 | Homan et al. | 73/161 |
| 4,847,527 | A * | 7/1989 | Dohogne | 310/68 B |
| 5,012,684 | A * | 5/1991 | Humphries | 73/865.8 |
| 5,020,234 | A * | 6/1991 | Alkire et al. | 33/656 |
| 5,295,388 | A * | 3/1994 | Fischer et al. | 73/12.09 |
| 5,382,853 | A * | 1/1995 | von der Heide et al. | 310/67 R |
| 5,469,005 | A * | 11/1995 | Asama et al. | 310/68 B |
| 5,524,474 | A * | 6/1996 | Lavallee et al. | 73/12.09 |
| 5,532,533 | A * | 7/1996 | Mizutani | 310/68 B |
| 5,600,192 | A * | 2/1997 | Carson et al. | 310/68 B |
| 6,668,639 | B2 * | 12/2003 | Fong et al. | 73/161 |
| 7,112,909 | B2 | 9/2006 | Swartout et al. | |
| 7,117,754 | B2 * | 10/2006 | Neely et al. | 73/862.333 |
| 7,275,844 | B2 * | 10/2007 | Watanabe | 362/473 |
| 7,418,858 | B2 | 9/2008 | Fischer et al. | |
| 7,743,675 | B2 | 6/2010 | Moore | |
| 2002/0026827 | A1 * | 3/2002 | Fong et al. | 73/161 |
| 2005/0264110 | A1 * | 12/2005 | Humphries et al. | 310/68 B |
| 2007/0118335 | A1 * | 5/2007 | Andarawis et al. | 702/188 |
| 2008/0036336 | A1 * | 2/2008 | Salem et al. | 310/68 B |
| 2008/0143216 | A1 * | 6/2008 | Berkcan et al. | 310/346 |
| 2009/0245717 | A1 | 10/2009 | Iversen et al. | |

FOREIGN PATENT DOCUMENTS

| | | |
|---|---|---|
| EP | 1890374 A2 | 2/2008 |
| EP | 2194388 A2 | 6/2010 |
| EP | 2363699 A1 | 9/2011 |
| JP | 57199452 A | 12/1982 |
| JP | 59165942 A | 9/1984 |
| WO | 2010030456 A2 | 3/2010 |

OTHER PUBLICATIONS

Search Report from corresponding GB Application No. GB1113818.7 dated Nov. 17, 2011.

* cited by examiner

*Primary Examiner* — Quyen Leung
*Assistant Examiner* — Alex W Mok
(74) *Attorney, Agent, or Firm* — Ann M. Agosti

(57) ABSTRACT

A system for monitoring health of an electrical machine is provided. The system includes at least one sensor element embedded in at least one substrate element located in a stator core. The system further includes a measuring subsystem coupled to the at least one sensor element and configured to monitor the health based on changes in electromagnetic characteristics of the sensor element due to changes in force acting on the substrate element or compression of the substrate element.

28 Claims, 6 Drawing Sheets

SYSTEM AND METHOD FOR MONITORING HEALTH OF ELECTRICAL MACHINES

BACKGROUND

The invention relates generally to electrical machines and in particular, to a system and method of monitoring health of electrical machines.

Generally, an electrical machine such as power generator or motor is routinely monitored for proper maintenance and high efficiency during operation. One of the few aspects of monitoring health of the electrical machine is inspecting stator bar windings to ensure the windings are motionless during the operation. Typically, an electrical machine includes a wedge system to induce a radial retaining force to a stator to facilitate reducing movement of the stator bar windings within a stator slot. Such a wedge system may also include ripple springs embedded in the stator winding assembly. The ripple springs are generally in a state of compression to keep the windings from moving. However, if the wedge system becomes loose, the amount of retaining force is reduced such that the stator bar windings may move during operation. Over time, the relative motion of the stator bar windings causes damage to the insulation surrounding the stator bar wedges and a potential stator bar winding failure can occur. This may result in electrical shorts to ground, thereby, diminishing the efficiency of the machine and further decreasing the mean time between failures of the electrical machines. Accordingly, monitoring the health of the electrical machine is periodically carried out to determine if any stator bar winding movement within the stator slots exceeds predetermined tolerances.

Currently, several methods and systems are used for monitoring the health of the electrical machine such as the stator wedge tightness. These include applying steady or impulsive physical force to the stator wedge winding assembly and analyzing deflection, applying an excitation signal and analyzing the vibratory response, measuring the profile of the compressed ripple spring in situ and inferring the state of compression, or installing various sensors along the ripple spring that produce signals that may be correlated to the spring's state of compression. However, the aforementioned methods for determining the tightness of the wedge require offline measurements while the generator is not operational and do not predict the onset of loose wedges. Further, these current methods require either undue laborious or time-consuming effort to adjudge the tightness of an individual stator wedge assembly or they require calibration of a sensor that is proximate to a ripple spring but not an integral part thereof. As the operating environment may reach a continuous temperature in the range −20° C. to 150° C., there is also a need to provide a sensor that will remain stable over the operating temperature regime. Moreover, the sensors often used for monitoring have the tendency to drift with time and hence are unstable over a period of time, resulting in incorrect monitoring of health of electrical machines.

Therefore, to assess the condition of the electrical machine, there is a need for an efficient monitoring system that easily and rapidly monitors the health.

BRIEF DESCRIPTION

In one embodiment, a system for monitoring health of an electrical machine is provided. The system includes at least one sensor element embedded in at least one substrate element located in a stator core. The system further includes a measuring subsystem coupled to the at least one sensor element and configured to monitor the health based on changes in electromagnetic characteristics of the sensor element due to changes in force acting on the substrate element or compression of the substrate element.

In one embodiment, a system for monitoring stator wedge tightness in an electrical machine is provided. The system includes at least one sensor element embedded in or disposed on at least one substrate element located proximate to the stator wedge of a stator core. The system also includes at least one switch for indicating a state of compression in the substrate element. Further, the system includes a measuring subsystem coupled to the at least one sensor element and configured to monitor the stator wedge tightness based on changes in electromagnetic characteristics of the sensor element due to changes in compression of the substrate element.

In one embodiment, a method for monitoring stator wedge tightness in an electrical machine is provided. The method includes providing at least one sensor element embedded in or disposed on at least one substrate element located in a stator core. The method also includes generating signals based on changes in electromagnetic characteristics of the sensor element corresponding to changes in compression of the substrate element. Further, the method includes determining the stator wedge tightness by analyzing the signals.

In one embodiment, a method for monitoring health in an electrical machine is provided. The method includes providing at least one sensor element embedded in or disposed on at least one substrate element located in a stator core. The method also includes generating signals based on changes in electromagnetic characteristics of the sensor element corresponding to changes in time varying force acting on the substrate element during operation or shutdown of the machine. Further, the method includes determining the health of the machine by analyzing the signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
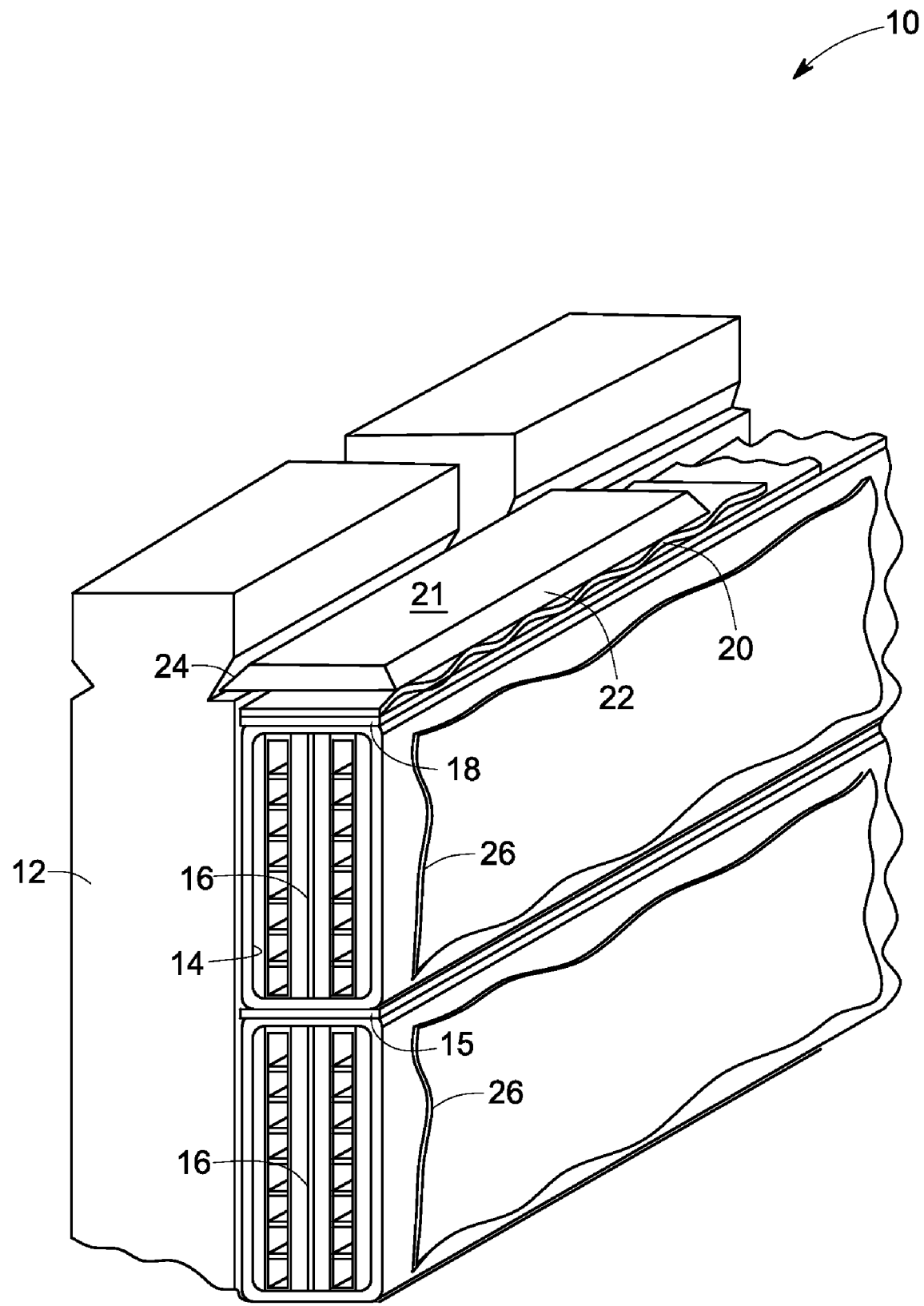
FIG. 1 is a fragmentary isometric view of a portion of the stator of an electric machine illustrating a stator wedge arrangement in accordance with an embodiment of the invention.

FIG. 1 illustrates a fragmentary isometric view of a portion of a stator core 10 of an electrical machine having a stator wedge mechanism in accordance with an embodiment of the invention. The stator core 10 includes multiple stator teeth 12; which stator teeth 12 further include stator slots 14 configured to accommodate stator windings 16 (also referred to as the stator coils). The stator windings 16 are retained in the stator slots 14 by multiple substrate elements shown as flat plates 15, shims 18, ripple springs 20, and stator wedges 21 having beveled edges 22 for engaging correspondingly shaped grooves 24 in the sidewalls of the stator teeth 12. Thus, non-limiting examples of substrate elements include flat plates, ripple springs, force-to-displacement transducers and springs such as axial and radial springs and Belleville washers. In one embodiment the flat plate 15 includes a metallic flat plate (conductive). In another embodiment, the flat plate includes a non-metallic flat plate (non-conductive). The ripple springs 20 are compressed between the stator wedges 21 and shims 18 to generate a force that firmly holds the stator windings 16 in place. In one embodiment, the ripple spring 20 is fabricated from a non-conductive material such as, but not limited to, a plastic laminate. The stator core 10 also includes multiple side ripple springs 26 to maintain tight fiting of the stator windings 16 within the stator core 10.

Over time, the ripple springs 16 or side ripple springs 26 may lose their resiliency so that the stator wedges 21 become loose. This can permit the stator windings 16 to vibrate, which can result in damage to the stator core 10 and eventual failure of the electrical machine. In order to monitor the tightness of the stator wedge mechanism, the ripple spring 20 includes embedded sensor elements that change one or more electromagnetic characteristics along with the compression or decompression of the ripple spring 20. The signals indicating changes in electromagnetic characteristics are acquired from an electrical interface of the ripple spring, for example a single port electrical interface, by a measuring subsystem for further analysis of the signals and subsequent determination of the wedge tightness. Thus, the measuring subsystem efficiently measures the static compression force experienced by the ripple springs 20. In one embodiment, the side ripple spring also includes sensor elements for measuring the tightness of the stator wedge mechanism. In another embodiment, the sensor elements are disposed on the ripple spring 20.

Furthermore, in one embodiment, the flat plate 15 located between the stator windings 16 includes embedded sensors. In another embodiment, sensors may be disposed on the flat plate 15, which sensors are coupled to a measuring subsystem. The embedded sensors are coupled to the measuring subsystem for measuring time varying forces acting on the flat plate 15 during operation or shutdown of the electrical machine. The flat plate 15 experience the time varying force due to varying magnetic field, which time varying forces can further be efficiently used to calibrate a sensor data. This results in correct sensing and estimation of information for monitoring health of the electrical machine. In yet another embodiment, at least two sensors are embedded in or disposed on multiple substrate elements for measuring the health of the electrical machine during operation or shutdown.

Figure 2:
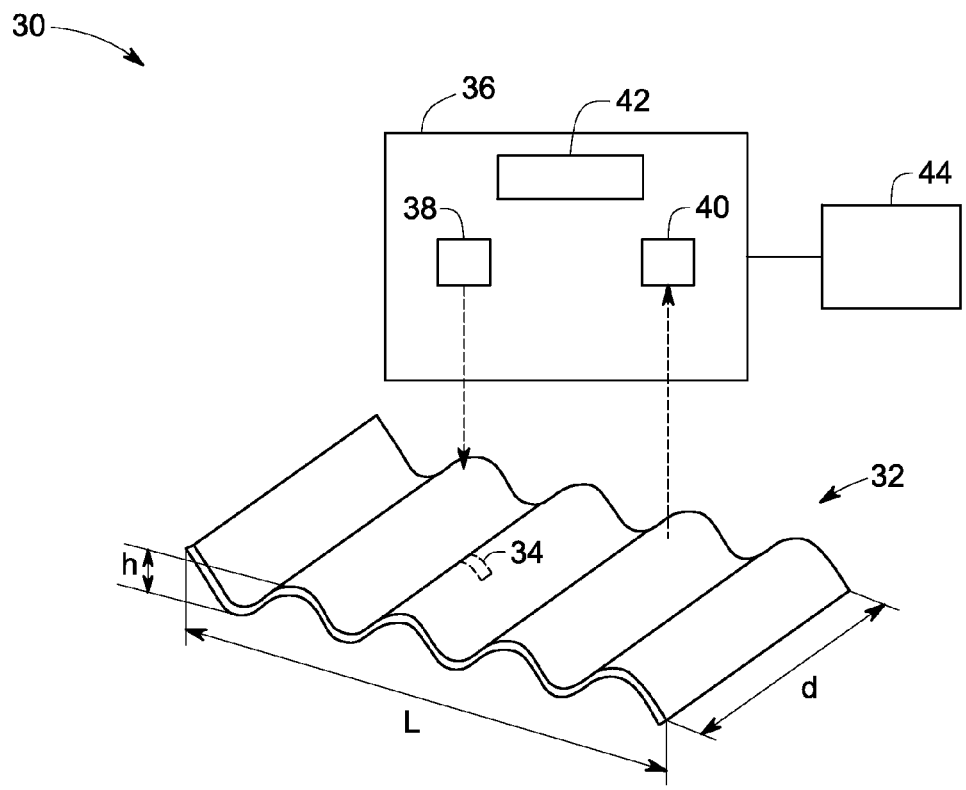
FIG. 2 illustrates a measuring system coupled to an exemplary ripple spring used within the electric machine of FIG. 1.
Figure 4:
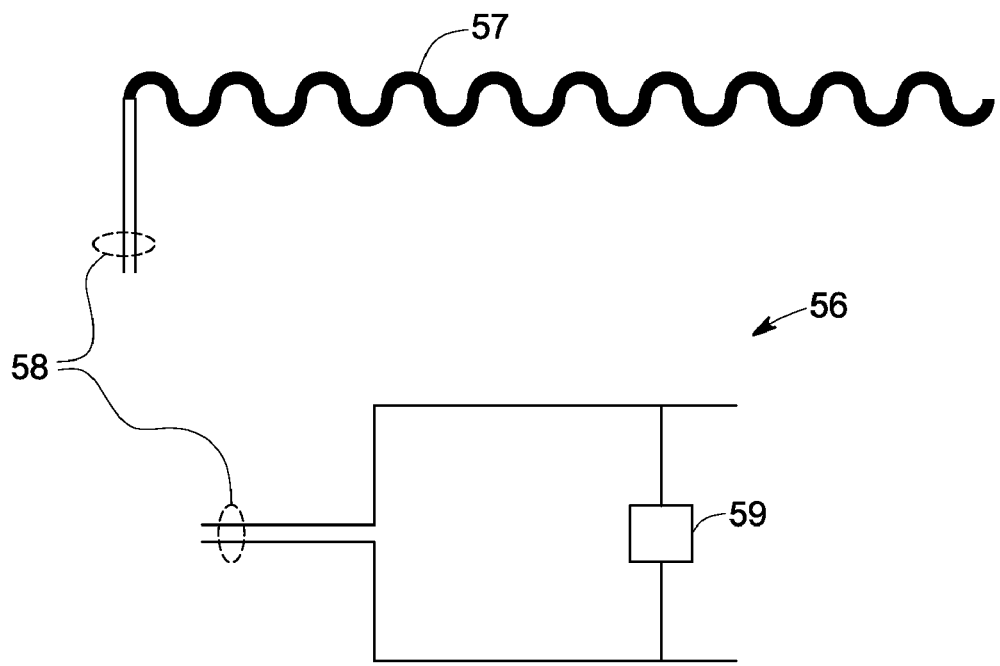
FIG. 4 illustrates an equivalent circuit to a ripple spring in accordance with an embodiment of the invention.

FIG. 2 illustrates a measurement system 30 coupled to an exemplary ripple spring 32 for measuring tightness of the stator wedge of an electrical machine (as shown in FIG. 1). As shown in an isometric view, in one embodiment the ripple spring 32 (shown as 22 in FIG. 1) includes at least one sensor element 34 embedded within the ripple spring 32. Non-limiting examples of the sensor element 34 include a dielectric, conductor, resistor, capacitor, inductor, semiconductor, optical sensor, piezoelectric sensor, pressure sensor or strain sensor. Further, the measurement system 30 includes a measuring subsystem 36. In the exemplary embodiment, the measuring subsystem 36 includes a transmitter 38 and a receiver 40 remotely coupled to the sensor element 34 of the ripple spring 32. The transmitter 38 and the receiver 40, thus, include a wireless communication mode. In another exemplary embodiment, the measurement system 30 is in direct physical communication with the sensor element 34 of the ripple spring 32 through a one-port electrical interface 58 (as shown in FIG. 4). The measurement system 30 also includes a computer 44 configured to receive information from the measuring subsystem 36 and to analyze data received from the sensor element 34. In another embodiment, measuring subsystem 36 includes a power source 42 configured to supply power to the measuring subsystem 36 and the sensor element 34. As used herein, the term computer is not limited to just those integrated circuits referred to in the art as computers, but broadly refers to computers, processors, microcontrollers, microcomputers, programmable logic controllers, application specific integrated circuits, and other programmable circuits.

Furthermore, in the exemplary embodiment as shown, the ripple spring 32 has an uncompressed height h of about 2-4 millimeters and a wave cycle of about 2-4 centimeters. It is to be noted that the ripple spring length L and a width d are variably selected depending on the size of stator slot (shown as slot 14 in FIG. 1). In another embodiment, the ripple spring 32 is multiple layered having a top portion layer, a middle portion layer and an oppositely disposed bottom portion layer. The sensor element 34 may be bonded to a surface of the middle portion in one embodiment.

Each of the sensor elements 34 continuously changes one or more electromagnetic characteristics along with compression of the ripple spring 32 and provides a continuous measurement of the tightness of the stator wedge in the electrical machine. In operation, the measuring subsystem 36 is energized by the power source 42 such that energy is transmitted to the sensor element 34. The measuring subsystem 36 is configured such that the receiver 38 receives a signal from the sensor element 34. In the exemplary embodiment, the sensor element 34 exhibits a change in current flow corresponding to a change in mechanical conditions within the stator slot. Such change in current flow is proportional to an electrical impedance of the sensor element 34. The receiver 40 is configured to measure the electrical impedance the sensor element 34 embedded within the ripple spring 32. Change in the electrical impedance indicates a measure of the winding tightness. In one embodiment, transfer functions that relate the electrical impedance to the thickness or relaxation measurement of the ripple spring 32 are used to determine the winding tightness in the electrical machine. In case of any deviation from a pre determined value for the winding tightness, a fault signal may be generated. It is to be noted that, the sensor element 34 may also profile multiple aspects of the stator windings including thermal characteristics of the ripple spring 32 indicating a temperature within the stator slot and radio frequency characteristics of the ripple spring 32 indicating a partial discharge within the stator slot (shown as slot 14 in FIG. 1).

Figure 3:
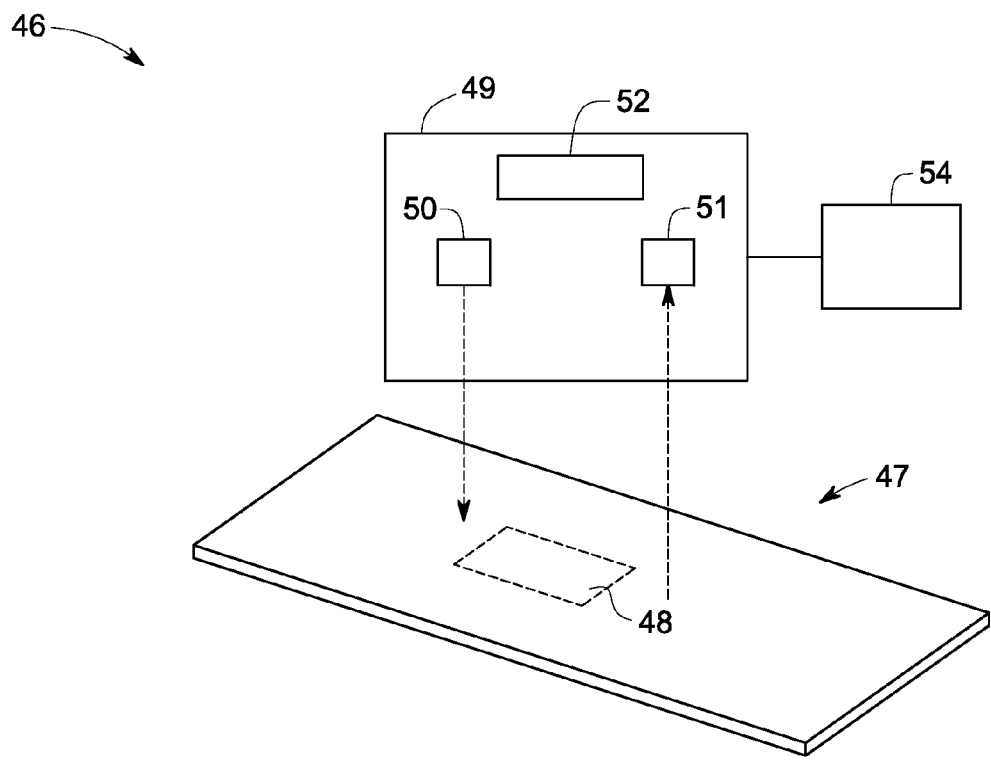
FIG. 3 illustrates a measuring system coupled to an exemplary flat plate used within the electric machine of FIG. 1

FIG. 3 illustrates a measurement system 46 coupled to an exemplary metal plate 47 used within the electric machine of FIG. 1 for measuring a time varying force on the stator windings. It is to be noted that the time varying force is a function of loads on the electrical machine. Therefore, during operation of the electrical machine, the measurement of the time varying force allows the analyses of loads on the electrical machine and further estimation of information for monitoring health of the electrical machine. As shown, in an isometric view, in one embodiment the metal plate 47 (shown as 15 in FIG. 1) includes at least one sensor element 48 embedded within the metal plate 47. Non-limiting examples of the sensor element 48 include a dielectric, conductor, resistor, capacitor, inductor, semiconductor, optical sensor, piezoelectric sensor, pressure sensor, strain sensor or a load sensor. Further, the measurement system 46 includes a measuring subsystem 49. In the exemplary embodiment, the measuring subsystem 49 includes a transmitter 50 and a receiver 51 remotely coupled to the sensor element 48 of the metal plate 47. The transmitter 50 and the receiver 51, thus, include a wireless communication mode. In another exemplary embodiment, the measurement system 46 is in direct physical communication with the sensor element 48 of the metal plate 47 through a one-port electrical interface. The measurement system 46 also includes a computer 54 configured to receive information from the measuring subsystem 49 and to analyze data received from the sensor element 48. In another embodiment, measuring subsystem 49 includes a power source 52 configured to supply power to the measuring subsystem 49 and the sensor element 48. Advantageously, the analyses of loads on the electrical machine by measurement of time varying force signals acting on the metal plate 47, provides for the calibration of the sensor element 48. The calibration of the sensor element is important since sensors drift with time resulting in incorrect sensing of signals. The calibration of sensor element, thus, provides for use of stable sensors in electrical machines operating in a particular environment.

FIG. 4 illustrates an equivalent circuit 56 to a ripple spring 57 in accordance with an exemplary embodiment of the present invention. A component 59 in the circuit 56 is a representation of a sensor element embedded in the ripple spring 57. In the circuit 56, the component 59 is placed across a single-port electrical interface 58 through which sensed information is transmitted continuously to a measuring subsystem 30 (shown in FIG. 2). Non-limiting examples of the sensed information includes resistance, conductance, magnetic permeability or permittivity. The measuring subsystem analyses the sensed information to further determine compression of the ripple spring 57, and thereby, the tightness of the stator wedge of the electrical machine.

Figure 5:
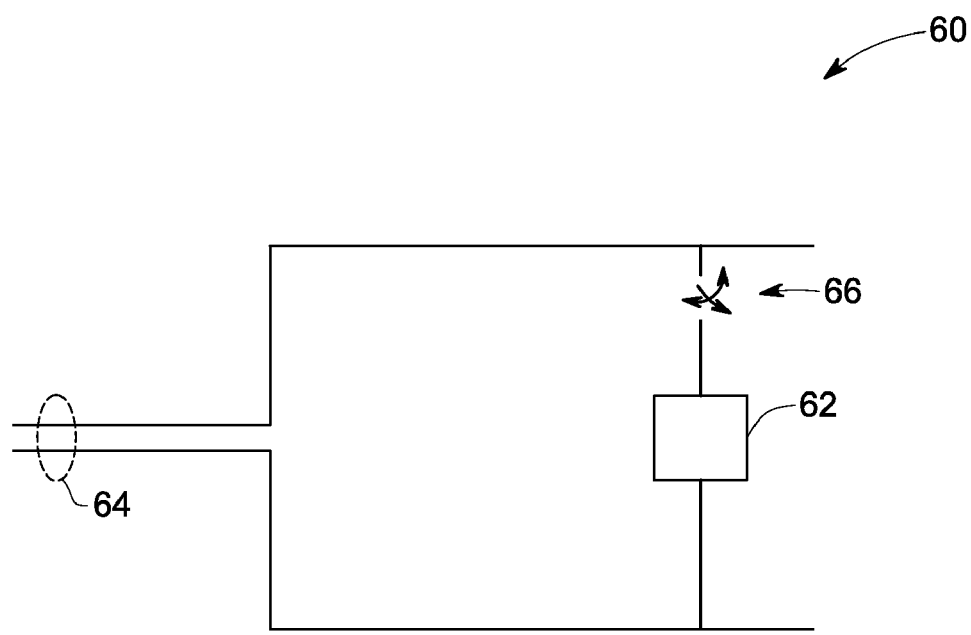
FIG. 5 illustrates an equivalent circuit to a ripple spring having a two-state device in accordance with another embodiment of the present invention.

In another embodiment, an equivalent circuit 60 to a ripple spring is illustrated in FIG. 5. In this embodiment, the ripple spring includes a two-state device such as a mechanical switch depicted as component 66 in the equivalent circuit 60. In one embodiment, the mechanical switch 66 closes when the wave height h (as shown in FIG. 2) of the ripple spring is equal to or exceeds a threshold value of wave height. Below the threshold value, the mechanical switch 66 is in an open state. As shown, the mechanical switch 66 is in an electrical series connection with a sensor component 62 in the equivalent circuit 60. In one embodiment, the sensor component 62 is a representation of a fixed parameter one-port electrical device placed across a single-port electrical interface 64. Non-limiting examples of the sensor component 62 includes a resistor, a capacitor or an inductor. Both mechanical switch 66 and the sensor component 62 are embedded within the ripple spring and are connected in electrical series with each other across the single-port electrical interface 64, which single-port electrical interface 64 provides for an external connection to the measuring subsystem 30 of FIG. 2. Thereby, this embodiment provides for a discrete measurement of electromagnetic characteristics to estimate the wave height h (as shown in FIG. 2) of the ripple spring above or below the threshold or optimum value, which threshold or optimum value is indicative of tightness of the stator wedge of the electrical machine.

Figure 6:
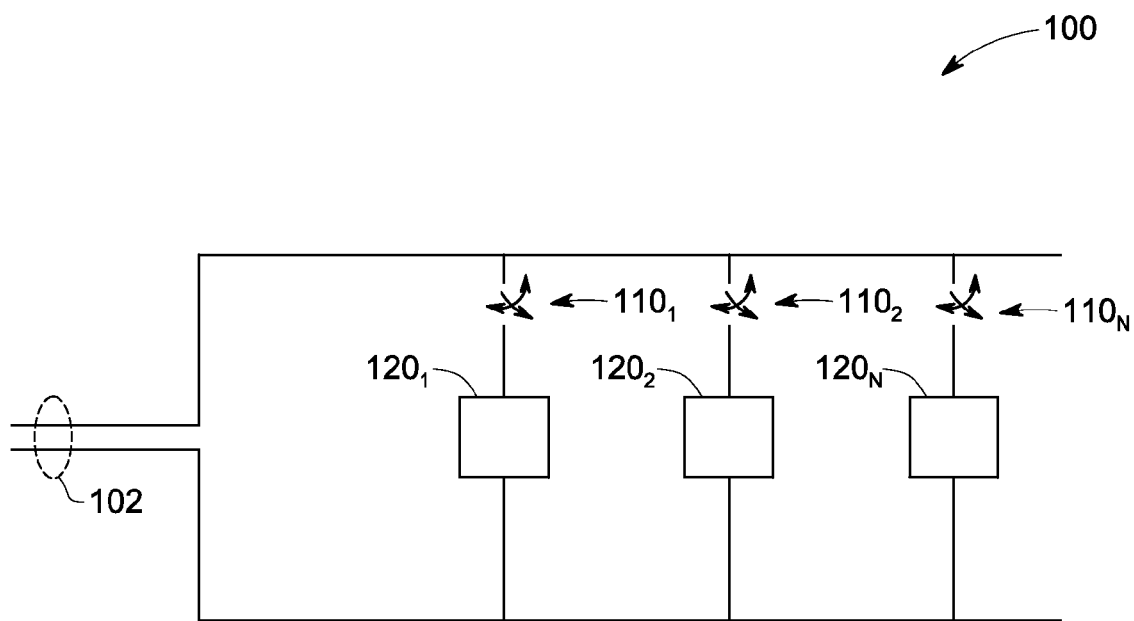
FIG. 6 illustrates an equivalent circuit to a ripple spring having multiple two-state devices and sensor components in accordance with another embodiment of the present invention.

FIG. 6 is an exemplary embodiment of the present invention that illustrates an equivalent circuit 100 having multiple two state devices (also referred to as switches) $110_1$, $110_2$ and $110_N$ and sensor elements $120_1$, $120_2$ and $120_N$. It is to be noted that there may be any number of switches or sensor elements denoted by 'N' in the circuit 100 and may not be restricted to the number of switches or sensor elements as shown in FIG. 6. In one embodiment, the equivalent circuit 100 includes an assembly of at least one switch $110_1$ coupled in electrical series with at least one sensor element $120_1$ embedded in the ripple spring. In another embodiment as illustrated, the equivalent circuit 100 includes a parallel arrangement of the multiple assemblies across a single port electrical interface 102. A switch $110_K$ (not shown) is set such that when the wave height h (as shown in FIG. 2) crosses a threshold value $130_K$, the switch $110_K$ changes state. As shown, the arrangement of two-state devices (switches $110_1$, $110_2$ and $110_N$) and sensor elements ($120_1$, $120_2$ and $120_N$) allows substantial electrical measurement through the one-port electrical interface 102. The sensor elements $120_1$, $120_2$ and $120_N$ are selected such that any electrical parallel combination of the sensor elements selected by the 'N' number of switches, allows determination of a unique value and reveals the state of 'N' switches. Thereby, this embodiment provides for a discrete measurement of electromagnetic characteristics through the one-port electrical interface 102 to estimate the wave height h (as shown in FIG. 2) of the ripple spring within a compression range identified by the states of the 'N' switches.

Figure 7:
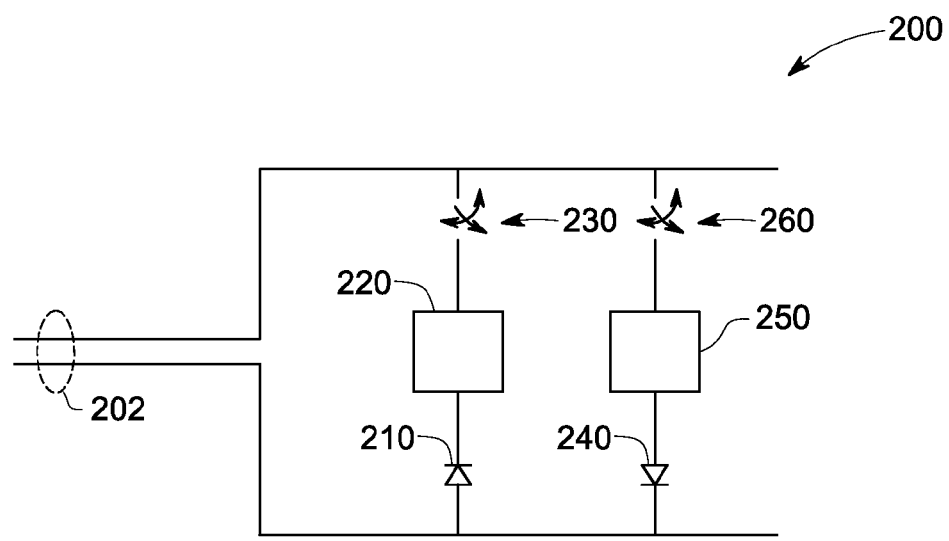
FIG. 7 illustrates an equivalent circuit to a ripple spring having multiple two-state devices, sensor components and diodes in accordance with another embodiment of the present invention

FIG. 7 is another exemplary embodiment of the present invention that illustrates an equivalent circuit 200 connected through a single-port electrical interface 202 to a measuring subsystem 30 as shown in FIG. 2. In one embodiment, the equivalent circuit 200 includes an assembly of a diode 210 coupled in series with a sensor element represented as component 220 and a switch 230 embedded in the ripple spring. The diodes 210 allow for a unidirectional flow of current in the circuit 200 and provides for instantiation of twice as many threshold values. Advantageously, this provides for accurate estimation of ripple spring compression by analysis of narrower regions between the threshold values identified by the states of the switches. As shown, the equivalent circuit 200 includes a parallel arrangement of the multiple assemblies having diodes (210, 240), sensor components (220, 250) and switches (230, 260) across the single port electrical interface 202. It is to be noted that there may be any number of diodes, switches or sensor elements and may not be restricted to the number of switches or sensor components shown in FIG. 7. The parallel arrangements of the multiple diodes (210, 240), sensor components (220, 250) and switches (230, 260) results in accurate measurement and determination of wave height h (as shown in FIG. 2) of the ripple spring. As discussed, the increased accuracy of the estimation of compression of the ripple spring is because of the instantiation of twice as many threshold values as compared to the embodiment of FIG. 6. The results of the exemplary embodiment, when depicted in a compression force versus wave height graph, may reveal partition of a compression-wave height curve into four compression regions due to the diodes 210 and 240 allowing different direction of current flows.

Figure 8:
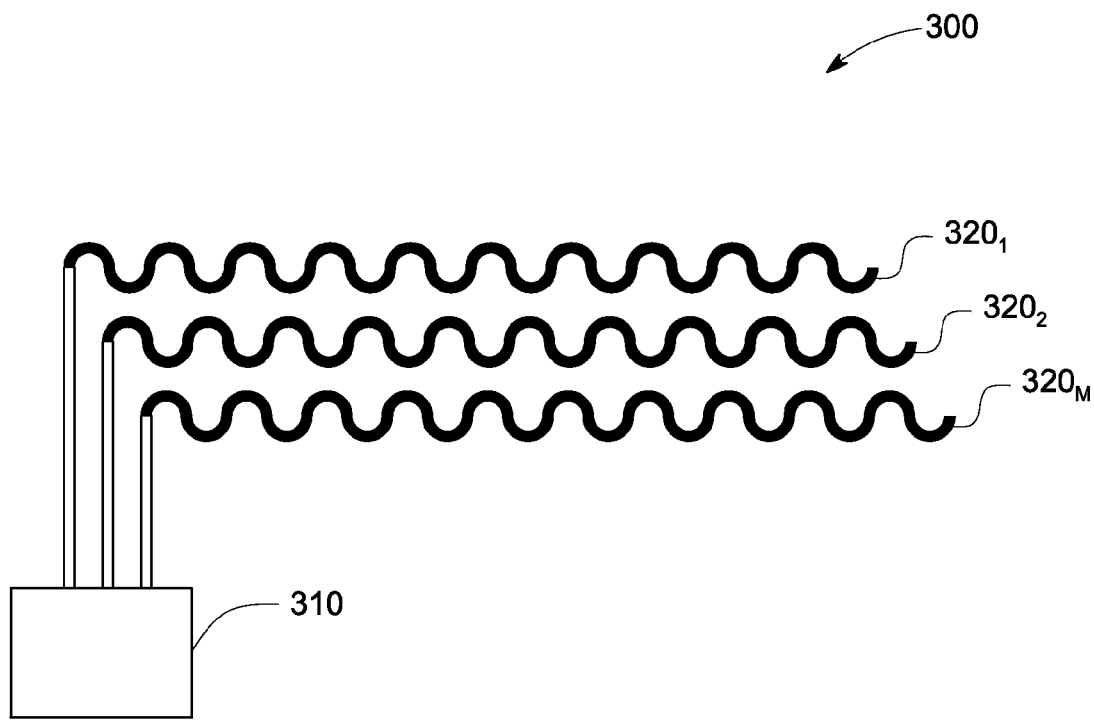
FIG. 8 illustrates a system for determining stator wedge tightness for multiple ripple springs in accordance with another embodiment of the present invention.

FIG. 8 is an embodiment of the present invention that illustrates a system 300 for determining stator wedge tightness of an electrical machine. The system 300 includes 'M' number of multiple ripple springs ($320_1$, $320_2$, $320_M$) located at multiple stator wedges in a stator. The one-port electrical interfaces of each ripple springs ($320_1$, $320_2$, $320_M$) are connected to a module 310, which module 310 is a device that sequentially or in parallel conducts electrical measurements on each of the 'M' ripple springs via the respective one-port electrical interface. Advantageously, the present embodiment, thus allows centralized and efficient testing of the compressions of the 'M' ripple springs and assessment of the stator wedge tightness for each ripple spring located in the electrical machine.

Figure 9:
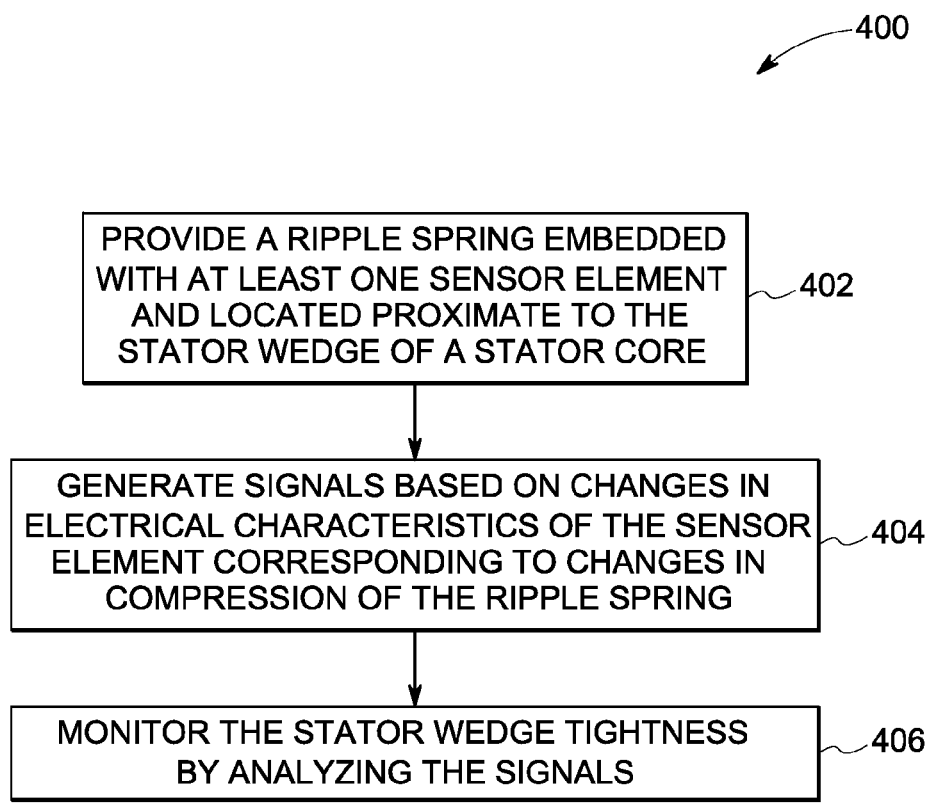
FIG. 9 is a flow chart of an exemplary method for monitoring stator wedge tightness of an electrical machine in accordance with an embodiment of the present invention.

FIG. 9 is a flow chart of an exemplary method 400 for monitoring stator wedge tightness of an electrical machine as shown in FIG. 1. In step 402, the method includes providing a ripple spring embedded with at least one sensor element and located proximate to the stator wedge of a stator core. Further in step 404, the method includes generating signals based on changes in electromagnetic characteristics of the sensor element corresponding to changes in compression of the ripple spring. Finally in step 406, the method includes monitoring the stator wedge tightness by analyzing the signals. This is achieved by using a measuring subsystem coupled to the at least one sensor element, which measuring system comprises a computer for analyzing and estimating the compression ranges of the ripple spring and thereby determining the stator wedge tightness.

Figure 10:
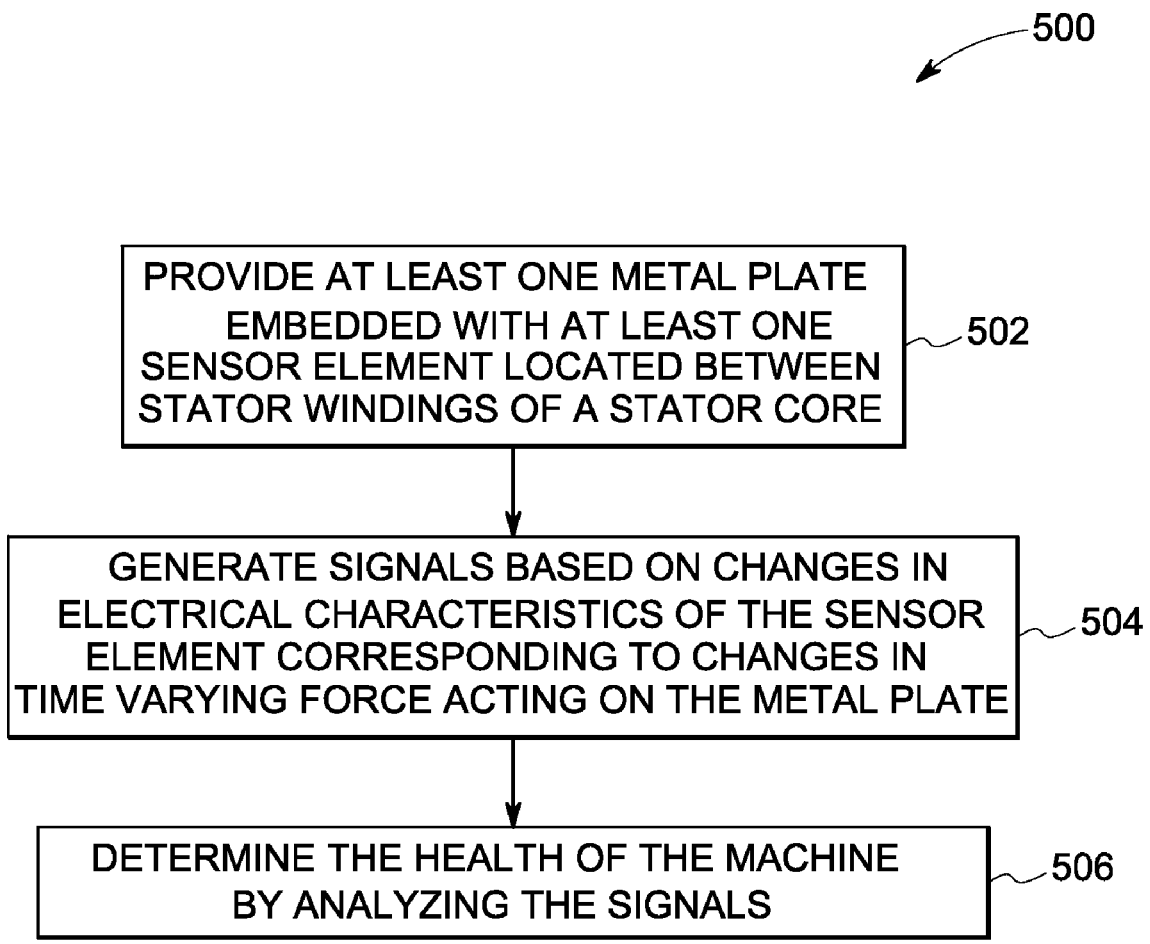
FIG. 10 is a flow chart of an exemplary method for monitoring health of an electrical machine in accordance with another embodiment of the present invention.

FIG. 10 is a flow chart of an exemplary method 500 for monitoring health of an electrical machine as shown in FIG. 1. In step 502, the method includes providing at least one sensor element embedded in at least one metal plate located between stator windings of a stator core. Further in step 504, the method includes generating signals based on changes in electromagnetic characteristics of the sensor element corresponding to changes in time varying force acting on the metal plate during operation of the machine. In one embodiment, the method also includes calibrating the sensor element using the generated signals. Finally in step 506, the method includes determining the health of the machine by analyzing the signals. This is achieved by using a measuring subsystem coupled to the at least one sensor element, which measuring system comprises a computer for analyzing and estimating the time varying force acting on the metal plate and thereby monitoring the health of the electric machine.

Advantageously, the present method and system according to one embodiment enables efficiently monitoring the health of the electrical machine by employing the technique of time varying force measurement and sensor calibration, resulting in correct sensing of conditions of the machine. Further, the present invention also enables the determination of stator wedge tightness by accurately estimating the compression ranges of the ripple spring. In addition, the use of diodes and switches in another embodiment enables the precise measurement of compression states the ripple springs. This information can then be effectively used by an operator to determine if the wedges need tightening, or estimate when the wedges will require tightening in the future. Thus, the present invention enables in predicting the onset of loose wedges and determining the tightness of the wedge during operation of the electrical machines. The electrical impedance measurements proposed herein are relatively easy to measure requiring minimum electrical components resulting in a low cost system. The sensor may be integrated into the ripple springs that hold stator components in place. Also, the electronics could be integrated into the ripple spring as well, or placed outside the electrical machine at the human interface providing flexibility to the measuring and diagnostic system. Furthermore, the present method and system for monitoring stator wedge tightness can be applied not only to a variety of electrical machines such as generators, motors, broadband generators and the like.

It is to be understood that not necessarily all such advantages described above may be achieved in accordance with any particular embodiment. Thus, for example, those skilled in the art will recognize that the systems and methods described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for monitoring health of an electrical machine, the system comprising:
   at least one sensor element embedded in or directly disposed on at least one substrate element located in a stator core;
   a measuring subsystem coupled to the at least one sensor element and configured to monitor the health based on changes in electromagnetic characteristics of the sensor element due to changes in force acting on the substrate element or compression of the substrate element during operation and shutdown of the electrical machine.

2. The system of claim 1, wherein the substrate element comprises a flat plate, a spring, and a ripple spring.

3. The system of claim 2, wherein the substrate element is located between a stator wedge and a stator winding in a stator slot.

4. The system of claim 1, wherein the substrate element is located between stator windings of the stator core, said substrate element includes a metallic or non-metallic flat plate.

5. The system of claim 1, wherein the electromagnetic characteristics of the sensor element embedded in or disposed on the substrate element varies with the time varying force acting on the substrate element during the operation of the electrical machine.

6. The system of claim 1, wherein the electromagnetic characteristics of the sensor element embedded in or disposed on the substrate element varies with compression of the substrate element during the operation or shutdown of the electrical machine.

7. The system of claim 1, wherein the system comprises at least two sensors embedded in or disposed on a plurality of substrate elements for measuring the health of the electrical machine during operation or shutdown.

8. The system of claim 1, wherein the sensor element comprises a dielectric, conductor, resistor, capacitor, inductor, semiconductor, optical sensor, piezoelectric sensor, pressure sensor, strain sensor and a load sensor.

9. The system of claim 1, wherein the system monitors the stator wedge tightness continuously during operation of the electrical machine.

10. The system of claim 1, wherein the electromagnetic characteristics comprises resistance, strain, conductance, magnetic permeability and permittivity.

11. The system of claim 1, wherein any change in the electromagnetic characteristics of the sensor element is acquired by the measuring subsystem through one-port electrical interface.

12. The system of claim 1, wherein the measuring subsystem is configured to interrogate the at least one sensor element continuously or at a predetermined interval.

13. A system for monitoring stator wedge tightness in an electrical machine, the system comprising:
   at least one sensor element embedded in or disposed on at least one substrate element located proximate to the stator wedge of a stator core;
   at least one switch for indicating a state of compression in the substrate element; and
   a measuring subsystem coupled to the at least one sensor element and configured to monitor the stator wedge tightness based on changes in electromagnetic characteristics of the sensor element due to changes in compression of the substrate element.

14. The system of claim 13, wherein the substrate element comprises a flat plate, a spring, and a ripple spring.

15. The system of claim 13, wherein the switch indicates compression of the substrate element equal or above an optimum value.

16. The system of claim 13, wherein the at least one sensor element of the substrate element is connected in series with the at least one switch in an equivalent electrical circuit of the system.

17. The system of claim 13, wherein the system comprises an assembly of the at least one switch coupled in series with the at least one sensor element embedded in the substrate element.

18. The system of claim 17, wherein the system comprises a parallel arrangement of a plurality of said assemblies across a single port electrical interface of the system.

19. The system of claim 13, wherein the system comprises an assembly of a diode coupled in series with the switch and the sensor element of the substrate element in an equivalent electrical circuit.

20. The system of claim 13, wherein the system comprises a plurality of substrate elements arranged proximate to a plurality of stator wedges in the stator core, said substrate elements are coupled to a module through the single-port electrical interfaces and said module is a device configured to conducts electrical measurements sequentially or in parallel at the substrate elements via the single-port electrical interfaces.

21. A method for monitoring stator wedge tightness in an electrical machine, the method comprising;
   providing at least one sensor element embedded in or directly disposed on at least one substrate element located in a stator core;
   generating signals based on changes in electromagnetic characteristics of the sensor element corresponding to changes in compression of the substrate element; and
   determining the stator wedge tightness by analyzing the signals during operation and shutdown of the electrical machine.

22. The method of claim 21, wherein the substrate element comprises a flat plate, a spring, and a ripple spring.

23. The method of claim 21, wherein the method comprises providing a measuring subsystem coupled to the at least one sensor element for analyzing the signals.

24. The method of claim 21, wherein the method comprises monitoring and estimation of a compression range.

25. The method of claim 21, wherein the method comprises remotely monitoring the tightness of plurality of substrate elements arranged proximate to a plurality of stator wedges in the stator core.

26. A method for monitoring health of an electrical machine, the method comprising;
   providing at least one sensor element embedded in or directly disposed on at least one substrate element located in a stator core;
   generating signals based on changes in electromagnetic characteristics of the sensor element corresponding to changes in time varying force acting on the substrate element during operation or shutdown of the machine; and
   determining the health of the machine by analyzing the signals during operation and shutdown of the electrical machine.

27. The method of claim 26, wherein the method further comprises calibrating the sensor element using the generated signals.

28. The method of claim 26, wherein the health of the machine includes information of optimal loads of the electrical machine.

* * * * *